United States Patent
Trovitch et al.

(10) Patent No.: US 12,180,232 B2
(45) Date of Patent: Dec. 31, 2024

(54) LATE FIRST ROW TRANSITION METAL ARYL DIIMINE CATALYSTS FOR HYDROFUNCTIONALIZATION AND DEHYDROCOUPLING

(71) Applicants: Ryan J. Trovitch, Phoenix, AZ (US); Anuja Sharma, Mumbai (IN); Thu Thao Nguyen, Mesa, AZ (US)

(72) Inventors: Ryan J. Trovitch, Phoenix, AZ (US); Anuja Sharma, Mumbai (IN); Thu Thao Nguyen, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 44 days.

(21) Appl. No.: 17/953,546

(22) Filed: Sep. 27, 2022

(65) Prior Publication Data

US 2023/0116103 A1     Apr. 13, 2023

Related U.S. Application Data

(60) Provisional application No. 63/249,151, filed on Sep. 28, 2021.

(51) Int. Cl.
| | | |
|---|---|---|
| C07F 13/00 | (2006.01) | |
| C07F 15/02 | (2006.01) | |
| C07F 15/04 | (2006.01) | |
| C07F 15/06 | (2006.01) | |

(52) U.S. Cl.
CPC .............. *C07F 13/00* (2013.01); *C07F 15/02* (2013.01); *C07F 15/04* (2013.01); *C07F 15/06* (2013.01)

(58) Field of Classification Search
CPC .......... C07F 13/00; C07F 15/02; C07F 15/04; C07F 15/06
See application file for complete search history.

(56) References Cited

U.S. PATENT DOCUMENTS

| | | | | |
|---|---|---|---|---|
| 5,258,348 | A | * 11/1993 | Van Buren | B01J 23/745 502/328 |
| 9,708,355 | B2 | 7/2017 | Trovitch et al. | |
| 10,407,451 | B2 | 9/2019 | Trovitch et al. | |
| 2003/0064883 | A1 | 4/2003 | Arndt-Rosenau et al. | |
| 2013/0313536 | A1 | 11/2013 | Nishimura et al. | |
| 2014/0326960 | A1 | 11/2014 | Kim et al. | |
| 2018/0141969 | A1 | 5/2018 | Hwang et al. | |
| 2018/0190915 | A1 | 7/2018 | Ji et al. | |
| 2019/0189939 | A1 | 6/2019 | Tsai et al. | |
| 2020/0172562 | A1 | 6/2020 | Yam et al. | |
| 2020/0176691 | A1 | 6/2020 | Yam et al. | |
| 2023/0116103 | A1 | 4/2023 | Trovitch et al. | |

FOREIGN PATENT DOCUMENTS

| | | | |
|---|---|---|---|
| CN | 102127116 | 7/2011 | |
| CN | 102633840 | 8/2012 | |
| EP | 3266790 | 1/2018 | |
| EP | 3392257 | 10/2018 | |
| KR | 10-2018-0137772 | 12/2018 | |
| KR | 10-2019-0070378 | 6/2019 | |
| WO | WO 2012009957 | 1/2012 | |
| WO | WO-2014097199 A1 * | 6/2014 | ............ C08F 136/06 |
| WO | WO 2018071697 | 4/2018 | |
| WO | WO 2018236092 | 12/2018 | |

OTHER PUBLICATIONS

Brulatti et al., "Luminescent Iridium(III) Complexes with N^C^N-Coordinated Terdentate Ligands: Dual Tuning of the Emission Energy and Application to Organic Light-Emitting Devices," Inorg. Chem., 2012, 51(6), 3813-3826.

Hejda et al., "Synthesis, Structure and Transmetalation Activity of Various C,Y-Chelated Organogold(I) Compounds," Eur. J. Inorg. Chem., 2012, 2012(15), 2578-2587.

Jia et al., "Scandium and gadolinium complexes with aryldiimine NCN pincer ligands: Synthesis, characterization, and catalysis on isoprene and 1,5-hexadiene polymerization," Polyhedron, 2018, 145, 182-190.

Jouaiti et al., "Synthesis and characterisation of a heterodinuclear ruthenium (II)-palladium (II) complex with two different cyclometalling sites," Inorg. Chim. Acta, 1996, 245(1), 69-73.

Khan et al., "Monomeric Sn(II) and Ge(II) hydrides supported by a tridentate pincer-based ligand," Chem. Commun., 2012, 48(40), 4890-4892.

Khan et al., "Preparation of RSn(I)-Sn(I)R with Two Unsymmetrically Coordinated Sn(I) Atoms and Subsequent Gentle Activation of P4," J. Am. Chem. Soc., 2011, 133(44), 17889-17894.

Luo et al., "Novel bis(azole) pincer palladium complexes: synthesis, structures and applications in Mizoroki-Heck reactions," Dalton Trans., 2011, 40(14), 3601-3609.

Luo et al., "Suzuki-Miyaura Coupling of Aryl Iodides, Bromides, and Chlorides Catalyzed by Bis(thiazole) Pincer Palladium Complexes," J. Org. Chem., 2012, 77(18), 8332-8337.

Ricica et al., "Intramolecularly coordinated organocadmium iodides," Inorg. Chim. Acta, 2015, 436, 39-44.

Simon et al., "Monomeric Organoantimony(I) and Organobismuth(I) Compounds Stabilized by an NCN Chelating Ligand: Syntheses and Structures, " Angew. Chem., Int. Ed., 2010, 49(32), 5468-5471.

Simon et al., "Monomeric organoantimony(III) sulphide and selenide with terminal Sb—E bond (E + S, Se). Synthesis, structure and theoretical consideration," Dalton Trans., 2012, 41(17), 5140-5143.

Stol et al., "2,6-Bis(oxazolinyl)phenylnickel(II) Bromide and 2,6-Bis(ketamine)phenylnickel(II) Bromide: Synthesis, Structural Features, and Redox Properties," Organometallics, 2007, 26(16), 3985-3994.

(Continued)

*Primary Examiner* — Alexander R Pagano
*Assistant Examiner* — Frank S. Hou
(74) *Attorney, Agent, or Firm* — Fish & Richardson P.C.

(57) ABSTRACT

Aryl diimine first row metal compounds are described, as well as their synthesis and use as catalysts for the hydrofunctionalization of unsaturated organic compounds and main group element-main group element bond formation by dehydrogenative coupling.

16 Claims, No Drawings

(56) References Cited

OTHER PUBLICATIONS

Tarran et al., "Platinum(II) Complexes of N^C^N-Coordinating 1,3-Bis(2-pyridyl)benzene Ligands: Thiolate Coligands Lead to Strong Red Luminescence from Charge-Transfer States," Inorg. Chem., 2014, 53(11), 5738-5749.

Vicha et al., "High-Frequency 1H NMR Chemical Shifts of SnII and PbII Hydrides Induces by Relativistic Effects: Quest for PbII Hydrides," Inorg. Chem., 2016, 55(20), 10302-10309.

Wang et al., "Facile Synthesis and Characterization of Phosphorescent Pt(N^C^N)X Complexes," Inorg. Chem., 2010, 49(24), 11276-11286.

Yang et al., "Tuning of Redox Potentials by Introducing a Cyclometalated Bond to Bis-tridentate Ruthenium(II) Complexes Bearing Bis(N-methlbenzimidazolyl)benzene or -pyridine Ligands," Inorg. Chem., 2012, 51(2), 890-899.

\* cited by examiner

LATE FIRST ROW TRANSITION METAL ARYL DIIMINE CATALYSTS FOR HYDROFUNCTIONALIZATION AND DEHYDROCOUPLING

CROSS-REFERENCE TO RELATED APPLICATION

This application claims the benefit of U.S. Patent Application No. 63/249,151 filed on Sep. 28, 2021, which is incorporated herein by reference in its entirety.

STATEMENT OF GOVERNMENT INTEREST

This invention was made with government support under 1651686 awarded by the National Science Foundation. The government has certain rights in the invention.

TECHNICAL FIELD

This invention relates to the preparation of aryl diimine manganese, iron, cobalt, and nickel compounds, their use as catalysts for the hydrofunctionalization of unsaturated bonds, and their use as catalysts for the formation of new bonds via dehydrogenative substrate coupling.

BACKGROUND

Transition metal catalysts are widely used by the chemical industry to prepare small molecules and polymers. In many circumstances, the most active and robust catalyst for a given reaction features a precious metal (Ru, Os, Rh, Ir, Pd, or Pt). Precious metals are expensive due to their low abundance within Earth's crust. Moreover, precious metals exhibit toxicity, and small residual concentrations of these metals in a final product or material can be harmful to the consumer.

SUMMARY

This disclosure describes the use of chelating aryl diimine ligands to prepare late transition metal catalysts that are active for hydrofunctionalization and dehydrogenative coupling reactions. The aryl diimine ligands will coordinate to the metal center in κ$^4$- or κ$^5$-fashion, meaning that 4 or 5 main group elements will bind, respectively.

A first general aspect includes complexes that have one of the following general structures (G-1.1 through G-1.4):

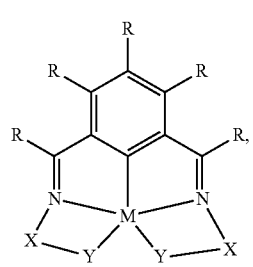

G-1.1

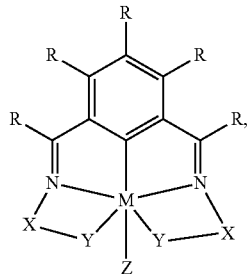

G-1.2

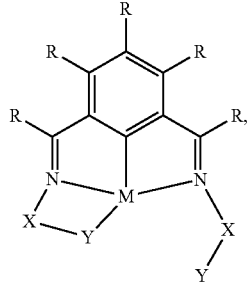

G-1.3

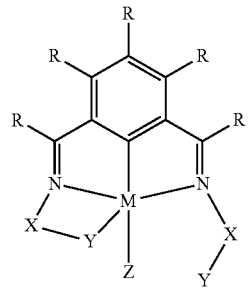

G-1.4 where:
  each M represents Mn, Fe, Co, or Ni;
  each Y independently represents PR$_n$, NR$_n$, AsR$_n$, SbR$_n$, BiR$_n$, OR$_n$, SR$_n$, SeR$_n$, TeR$_n$, a heterocycle comprising P, Sb, Bi, S, Se, Te, and combinations thereof, wherein n=2, 1, or 0;
  each X independently represents a substituted or unsubstituted alkylene or arylene linking group optionally comprising one or more heteroatoms;
  each R, including R under the definition of Y, independently represents hydrogen; a substituted, unsubstituted, or cyclic C$_1$-C$_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; or any combination or salt thereof; and
  Z represents a hydride, alkyl, aryl, halide, alkoxide, aryloxide, carboxylate, or amido substituent.

In certain embodiments, structures G-1.1 through G-1.4 exist as the cationic or anionic component of a salt.

A second general aspect includes complexes that feature an agostic interaction between the metal center and one arene C—H bond (G-1.5 through G-1.8):

G-1.5
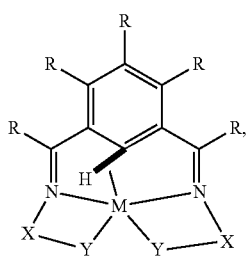

G-1.6
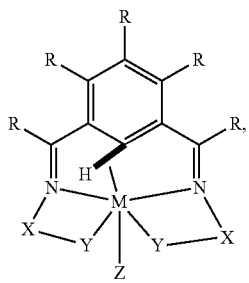

G-1.7
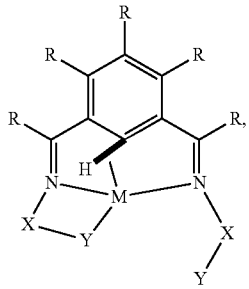

G-1.8
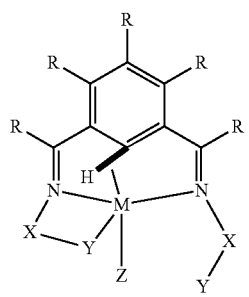

where:
  each M represents Mn, Fe, Co, or Ni;
  each Y independently represents $PR_n$, $NR_n$, $AsR_n$, $SbR_n$, $BiR_n$, $OR_n$, $SR_n$, $SeR_n$, $TeR_n$, a heterocycle comprising P, N, As, Sb, Bi, O, S, Se, Te, and combinations thereof, wherein n=2, 1, or 0;
  each X independently represents a substituted or unsubstituted $C_1$-$C_{24}$ alkylene or arylene linking group optionally comprising one or more heteroatoms;
  each R, including R under the definition of Y, independently represents hydrogen; a substituted, unsubstituted, or cyclic $C_1$-$C_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; or any combination or salt thereof; and Z represents a hydride, alkyl, aryl, halide, alkoxide, aryloxide, carboxylate, or amido substituent.

In certain embodiments, structures G-1.5 through G-1.8 exist as the cationic or anionic component of a salt.

A third general aspect includes complexes that can be converted to complexes G-1.1 through G-1.8 (G-1.9 through G-1.15), optionally in the presence of a base:

G-1.9
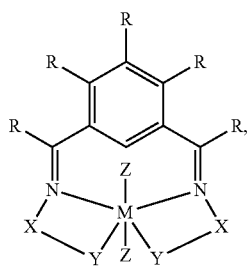

G-1.10
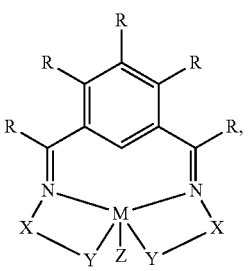

G-1.11
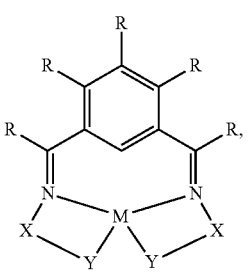

G-1.12
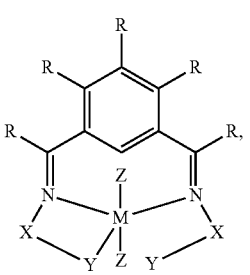

G-1.13
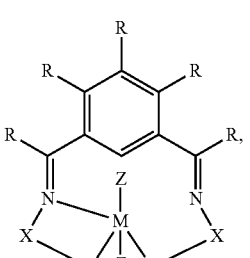

-continued

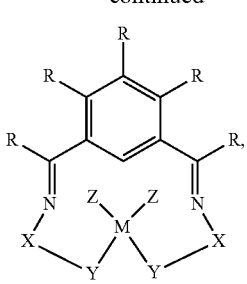

G-1.14

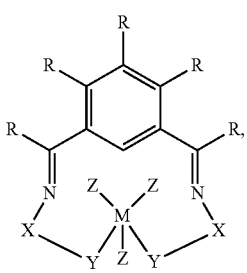

G-1.15 where:
- each M represents Mn, Fe, Co, or Ni:
- each Y independently represents $PR_n$, $NR_n$, $AsR_n$, $SbR_n$, $BiR_n$, $SR_n$, $SeR_n$, $TeR_n$, a heterocycle comprising P, N, As, Sb, Bi, O, S, Se, Te, and combinations thereof, wherein n=2, 1, or 0;
- each X independently represents a substituted or unsubstituted $C_1$-$C_{24}$ alkylene or arylene linking group optionally comprising one or more heteroatoms;
- each including R under the definition of Y, independently represents hydrogen; a substituted, unsubstituted, or cyclic $C_1$-$C_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; or any combination thereof; and
- Z represents a hydride, alkyl, aryl, halide, alkoxide, aryloxide, carboxylate, or amide substituent:

In certain embodiments, structures G-1.9 through G-1.15 exist as the cationic or anionic component of a salt.

A fourth general aspect includes facilitating a hydrofunctionalization reaction. In one example, a compound of general formula G-1.1 through G-1.15, or a salt thereof, is used to facilitate the addition of a H—H, H—B, H—Al, H—C, H—Si, H—N, H—P, H—O, H—S, or H—Se bond across a double or triple bond within an unsaturated organic compound.

Some embodiments include the addition of base to activate compounds G-1.1 through G-1.15, or a salt thereof. Examples of suitable bases include potassium tert-butoxide; cesium carbonate, lithium diisopropylamide, sodium triethylborohydride, sodium borohydride, methylmagnesium bromide, and triethylamine. These examples are not intended to be limiting in scope.

In some embodiments of the fourth general aspect, the reaction takes place in a solvent. Examples of suitable solvents include pentane, toluene, tetrahydrofuran, diethyl ether, acetonitrile, and chloroform. These examples are not intended to be limiting in scope.

A fifth general aspect includes a method of facilitating a dehydrogenative coupling reaction. In one example, a compound of general formula G-1.1 through G-1.15, or a salt thereof, is used to facilitate the coupling of a H—B, H—Al, H—C, H—Si, H—P, H—O, H—S, or H—Se bond to a H—B, H—Al, H—C, H—N, H—P, H—O, H—S, or H—Se bond to generate a new heteroatom-heteroatom bond and hydrogen.

Some embodiments of the fifth general aspect include the addition of base to activate compounds G-1.1 through G-1.15, or a salt thereof. Examples of suitable bases include potassium tert-butoxide, cesium carbonate, lithium diisopropylamide, sodium triethylborohydride, sodium borohydride, methylmagnesium bromide, and triethylamine. These examples are not intended to be limiting in scope.

In some embodiments of the fifth general aspect, the reaction takes place in a solvent. Examples of suitable solvents include pentane, toluene, tetrahydrofuran, diethyl ether, acetonitrile, and chloroform. These examples are not intended to be limiting in scope.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes metal complexes that are supported by aryl diimine ligands, as well as the synthesis of these complexes. These metal complexes can be used as catalysts for hydrofunctionalization and dehydrogenative coupling.

Aspects of this disclosure can be understood more readily by reference to the following detailed description and the Examples included therein. Before the present compounds, devices, and/or methods are disclosed and described, it is to be understood that they are not limited to specific synthetic methods or temperatures unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of disclosed embodiments, example methods and materials are now described.

As used in the specification and the appended claims, the singular forms "a," "an" and "the" include plural referents unless the context clearly dictates otherwise. Thus, for example, reference to "a component" includes mixtures of two or more components.

As used herein, the terms "optional" or "optionally" mean that the subsequently described event or circumstance may or may not occur, and that the description includes instances where said event or circumstance occurs and instances where it does not.

The term "alkyl" as used herein is a branched or unbranched saturated hydrocarbon group of 1 to 24 carbon atoms ($C_1$-$C_{24}$), including without limitation methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, optionally substituted alkyl, cycloalkyl, alkoxy, amino, ether, halide, hydroxy, nitro, silyl, sulfoxo, or thiol.

Unless otherwise indicated, "alkylene," by itself or as part of another term, refers to a saturated, branched or straight chain or cyclic hydrocarbon diradical of the stated number of carbon atoms, typically 1-6 carbon atoms, and having two monovalent radical centers derived by the removal of two hydrogen atoms from the same or two different carbon atoms of a parent alkane. Typical alkylene radicals include, but are not limited to methylene (—$CH_2$—), 1,2-ethylene (—$CH_2CH_2$—), 2,2-dimethylene, 1,3-propylene (—$CH_2CH_2CH_2$—), 2-methylpropylene; 1,4-butylene (—$CH_2CH_2CH_2CH_2$—), and the like; optionally substituted, as appropriate, by 1 to 5 suitable substituents as defined above such as fluoro, chloro, deutero, cyano, trifluoromethyl, ($C_1$-$C_6$)alkoxy, ($C_6$-$C_{10}$)aryloxy, trifluoromethoxy, difluoromethoxy or ($C_1$-$C_6$)alkyl. When a compound contains a $C_{2-6}$ alkenyl group, the compound may exist as the pure E (entgegen) form, the pure Z (zusammen) form, or any mixture thereof.

The term "alkoxy" and "alkyloxy", which may be used interchangeably, refers to a moiety of the formula —OR, wherein R is a straight chain saturated alkyl or branched chain saturated alkyl moiety, as defined herein, bonded through an oxygen atom. The alkoxy group may be optionally substituted as defined herein. Non-limiting examples of such alkoxy groups are methoxy, ethoxy, propoxy, isopropoxy, butoxy, isobutoxy, tertiary butoxy, pentoxy and the like.

The term "aryl" means a carbocyclic aromatic system containing one or two rings wherein such rings may be fused. If the rings are fused, one of the rings must be fully unsaturated and the fused ring(s) may be fully saturated, partially unsaturated or fully unsaturated. The term "fused" means that a second ring is present (i.e., attached or formed) by having two adjacent atoms in common (i.e., shared) with the first ring. The term "fused" is equivalent to the term "condensed". The aryl group may be optionally substituted as defined herein. The term "aryl" embraces aromatic radicals such as phenyl, naphthyl, tetrahydronaphthyl, indanyl, biphenyl, benzo[b][1,4]oxazin-3(4H)-onyl, 2,3-dihydro-1H indenyl and 1,2,3,4-tetrahydronaphthalenyl. Aryls may be optionally substituted, as appropriate, by 1 to 5 suitable substituents as defined above such as fluoro, chloro, deutero, cyano, trifluoromethyl, $C_1$-$C_6$)alkoxy, ($C_6$-$C_{10}$)aryloxy, trifluoromethoxy, difluoromethoxy or ($C_1$-$C_6$)alkyl.

The term "arylene" as used herein, and unless otherwise specified, refers to a divalent aromatic substituent containing a single aromatic ring or multiple aromatic rings that are fused together or linked covalently. Preferred arylene groups contain one aromatic ring or two fused or linked aromatic rings. "Substituted arylene" refers to an arylene moiety substituted with one or more substituent groups, and the terms "heteroatom-containing arylene" and "heteroarylene" refer to arylene in which at least one carbon atom is replaced with a heteroatom. The term "arylene" as used herein, and unless otherwise specified, refers to a divalent aromatic substituent containing a single aromatic ring or multiple aromatic rings that are fused together or linked covalently. Preferred arylene groups contain one aromatic ring or two fused or linked aromatic rings. "Substituted arylene" refers to an arylene moiety substituted with one or more substituent groups, and the terms "heteroatom-containing arylene" and "heteroarylene" refer to arylene in which at least one carbon atom is replaced with a heteroatom.

The terms "amine" or "amino" as used herein are represented by the formula NA1A2A3, where A1, A2, and A3 can be, independently, hydrogen or optionally substituted alkyl, cycloalkyl, alkenyl, cycloalkenyl, alkynyl, cycloalkynyl, aryl, or heteroaryl group as described herein.

The term "halide" as used herein refers to the halogens fluorine, chlorine, bromine, and iodine.

The term "nitro" as used herein is represented by the formula —$NO_2$.

The term "nitrile" as used herein is represented by the formula —CN.

The term "thiol" as used herein is represented by the formula —SH.

Disclosed are the components to be used to prepare compositions described herein as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed.

Likewise, any subset or combination of these is also disclosed. Thus, for example, the sub-group of A-E, B-F, and C-E would be considered disclosed. This concept applies to all aspects of this application including, but not limited to, steps in methods of making and using compositions described herein. Thus, if there are a variety of additional steps that can be performed it is understood that each of these additional steps can be performed with any specific embodiment or combination of embodiments.

The addition of $FeBr_2$ to the phosphine-substituted ligand, 1,1'-(1,3-phenylene)bis(N-(3-(diphenylphosphaneyl)propyl)ethan-1-imine) represented by the formula ($^{Ph2PPr}$ADIH), allowed for the isolation of a precursor featuring a 2-coordinate chelate. The addition of $CoCl_2$ to the same ligand resulted in the formation of a dicobalt hexachloride salt of a cation featuring a Co—C bond and a 5-coordinate ligand 2,6-bis(1-((3-(diphenylphosphaneyl) propyl)-imino)ethyl)phenyl represented by the formula ($^{Ph2PPr}$ADI). Reduction of this salt afforded a neutral complex, ($^{Ph2PPr}$ADI)Co, which also features a Co—C bond and a 5-coordinate $^{Ph2PPr}$ADI ligand. Adding $^{Ph2PPr}$ADIH to Ni(COD)$_2$ resulted in ligand displacement to form a complex that features an agostic interaction between the metal center and one arene C—H bond. Heating a mixture of $^{Ph2PPr}$ADIH and (CO)$_5$MnBr to 90° C. afforded [($^{Ph2PPr}$ADI)MnH][Br]. This salt features a cation that possesses a 5-coordinate $^{Ph2PPr}$ADI ligand and a hydride ligand.

The efficient hydrosilylation of carbonyl compounds using metal complexes described herein has been observed. In the presence of an equimolar amount of phenylsilane and 0.1 mol % of ($^{Ph2PPr}$ADI)Co, greater than 99% conversion of benzaldehyde into a mixture of silyl ethers was observed after 2 min at ambient temperature. Under the same conditions, 0.1 mol % of ($^{Ph2PPr}$ADI)Co was used to achieve greater than 99% acetophenone hydrosilylation after 2 min at ambient temperature. In both cases, the silyl ethers were hydrolyzed to yield the corresponding alcohols.

The efficient hydrosilylation of carboxylate compounds using the metal complexes described herein has been observed. In the presence of an equimolar amount of phenylsilane and 0.1 mol % of ($^{Ph2PPr}$ADI)Co, greater than 99% conversion of ethyl formate into a mixture of silyl ethers was observed after 5 h at ambient temperature. In the presence of an equimolar amount of phenylsilane and 0.1 mol % of ($^{Ph2PPr}$ADI)Co, greater than 97% conversion of ethyl acetate into a mixture of silyl ethers was observed after 5 h at ambient temperature.

The dihydrosilylation of nitriles using metal complexes described herein has been observed. In the presence of 2.2 equivalents of diphenylsilane and 1 mol % of ($^{Ph2PPr}$ADI) Co, 40% conversion of benzonitrile into the corresponding N,N-disilylbenzylamine was observed after 24 h at 80° C.

Dehydrogenative coupling between anilines and silanes using metal complexes described herein has been observed. In the presence of 2.5 equivalents of diphenylsilane and 1 mol % of ($^{Ph2PPr}$ADI)Co, greater than 99% conversion of aniline into the corresponding N,N-disilylaniline was observed after 24 h at 80° C. In the presence of 1,3 equivalents of phenylsilane and 1 mol % of ($^{Ph2PPr}$ADI)Co, greater than 99% conversion of N-methylaniline into the corresponding N-methyl-N-silylaniline was observed after 24 h at 80° C. In the presence of phenylsilane and 5 mol % of [($^{Ph2PPr}$ADI)MnH][Br], partial conversion of diethylamine or dibutylamine to the corresponding aminosilane was observed at 25° C.

The formation of a polycarbosilazane using metal complexes described herein has been observed. In the presence of 0.5 mol % of ($^{Ph2PPr}$ADI)Co, the dehydrogenative coupling of tris(2-aminoethyl)amine and polymethylhydrosiloxane resulted in polymer formation within 5 min at ambient temperature.

EXAMPLES

The following examples are put forth so as to provide those of ordinary skill in the art with a complete disclosure and description of how the compounds, compositions, and/or methods claimed herein are made and evaluated, and are intended to be purely exemplary and are not intended to be limiting in scope. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Various synthetic procedures described herein are recited in the examples. These methods are provided to illustrate various methods of preparation, but are not intended to limit any of the methods recited herein. Accordingly, one of skill in the art in possession of this disclosure could readily modify a recited method or utilize a different method to prepare one or more of the compounds described herein. The following aspects are only exemplary and are not intended to be limiting in scope. Temperatures, catalysts, concentrations, reactant compositions, and other reaction conditions can vary, and one of skill in the art, in possession of this disclosure, could readily select appropriate reactants and conditions for a desired complex.

Preparation of Metal Complexes. Example A

Preparation of (1,1'-(1,3-phenylene)bis(N-(3-(diphenylphosphaneyl)propyl)ethan-1-imine))FeBr$_2$ [hereafter ($^{Ph2PPr}$ADIH)FeBr$_2$, shown below].

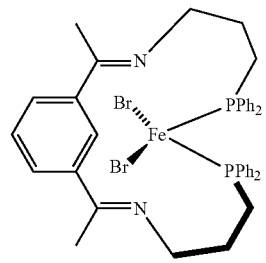

In a nitrogen-filled glovebox, a 100 mL thick-walled glass bomb was charged with 282 mg (1.29 mmol) of FeBr$_2$ and 790 mg (1.29 mmol) of $^{Ph2PPr}$ADIH in 20 mL of THF. The bomb was then sealed, taken outside the glovebox and heated in an oil bath at 80° C. After stirring for 12 h, a reddish-orange solution formed. The solution was filtered through a frit and the solvent was removed from the filtrate under vacuum. The solid residue left behind was washed with toluene and then dried to obtain 779 mg (73%) of ($^{Ph2PPr}$ADIH)FeBr$_2$.

$^1$H NMR (400 MHz, benzene-d$_6$): δ 14.53 (d, J=198.5 Hz, 4H, phenyl), 7.15 (s, 6H, phenyl), 7.02 (s, 2H, phenyl), 3.84 (s, 4H, CH$_2$), 2.34 (s, 3H), 1.90 (s, 4H, CH$_2$), 1.26 (s, 2H, CH$_2$), 0.87 (s, 2H, CH$_2$), −0.97 (d, J=68.2 Hz, 1H, phenyl).

Example B

Preparation of [(2,6-bis(1-(3-(diphenylphosphaneyl)propyl)-imino)ethyl)phenyl)Co$_2$Cl][Co$_2$Cl$_6$]$_{0.5}$ (hereafter [($^{Ph2PPr}$ADI)CoCl][Co$_2$Cl$_6$]$_{0.5}$, shown below).

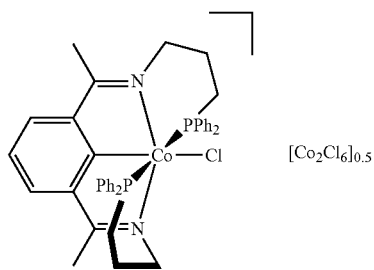

In a nitrogen-filled glovebox, a 100 mL thick-walled glass bomb was charged with 450 mg (3.46 mmol) of CoCl$_2$ and 1.274 g (2.07 mmol) of $^{Ph2PPr}$ADIH in 20 mL of toluene. The mixture turned greenish within 10 min. The Schlenk bomb was sealed, taken outside the glovebox and heated in an oil bath at 80° C. After stirring for 12 h, a green solid precipitated from the solution. The mixture was filtered through a frit and the residual solid collected on the top of frit was washed with 10 mL of toluene. The solid was allowed to dry under the vacuum to yield 1.807 g (27%) of [($^{Ph2PPr}$ADI)CoCl][Co$_2$Cl$_6$]$_{0.5}$. Single crystals were obtained from a concentrated solution of acetone at room temperature.

$^1$H NMR (400 MHz, chloroform-d): δ 13.45, 12.75, 7.38, 7.29, 7.11, 6.95, 6.18, 5.54, 5.07, 4.66, 3.40, 3.11, 1.18, 0.40, −0.91, −1.69.

$^{31}$P NMR (162 MHz, chloroform-d): δ 20.10 (br, PPh$_2$).

The solid-state structure of this compound was elucidated by single crystal X-ray diffraction.

Example C

Preparation of [(2,6-bis(1-((3-phenylphosphaneyl)propyl)imino)ethyl)phenyl)]Co [hereafter ($^{Ph2PPr}$ADI)Co, shown below].

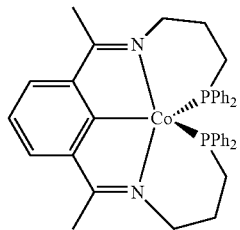

In a nitrogen-filled glovebox, a 20 mL scintillation vial was filled with 182.5 mg (0.210 mmol) of [($^{Ph2PPr}$ADI)CoCl][Co$_2$Cl$_6$]$_{0.5}$ in 5 mL of toluene and placed in a liquid nitrogen cooled cold well for 20 min. Another 20 mL scintillation vial containing 0.9 mL (0.882 mmol) of 1.0 M solution of NaEt$_3$BH in toluene was also cooled in the cold well for 20 min. The cold solution of NaEt$_3$BH was then added dropwise to the vial containing the suspension of [($^{Ph2PPr}$ADI)CoCl][Co$_2$Cl$_6$]$_{0.5}$. A color change from green to orangish-brown was observed after 10 min. After stirring for 4 h, the reaction mixture was filtered through Celite to remove the NaCl byproduct and the solvent was removed from the filtrate under vacuum. The solid residue left behind was washed with pentane and then dried to obtain 62.7 mg of ($^{Ph2PPr}$ADI)Co.

$^1$H NMR (400 MHz, benzene-d$_6$): δ 8.21 (d, J=8.4 Hz, 2H, phenyl), 7.52 (t, J=7.2 Hz, 4H, phenyl), 7.25 (t, J=7.4 Hz, 4H, phenyl), 7.13 (d, J=7.2 Hz, 2H, phenyl), 7.06 (d, 6.7 Hz, 1H, phenyl), 6.86 (d, J=7.3 Hz, 4H, phenyl), 6.75 (d, J=5.1 Hz, 5H, phenyl), 3.69 (d, J=12.8 Hz, 2H, CH$_2$), 2.99 (t, J=12.1 Hz, 2H, CH$_2$), 2.29 (d, J=5.5 Hz, 4H, CH$_2$), 1.78 (t, J=4.8 Hz, 4H, CH$_2$), 1.37 (s, 6H, CH$_3$).

$^{31}$P NMR (162 MHz, benzene-d$_6$): δ 33.87 (s, PPh$_2$).

The solid-state structure of this compound was elucidated by single crystal X-ray diffraction.

Example D

Preparation of [(1,1′-(1,3-phenylene)bis(N-(3-(diphenylphosphaneyl)propyl)ethan-1-imine)Ni] [hereafter ($^{Ph2PPr}$ADIH)Ni, shown below].

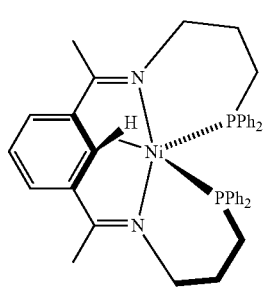

In a nitrogen-filled glovebox, a 20 mL scintillation vial was charged with 52.46 mg (0.19 mmol) of Ni(COD)$_2$ and 5 mL of toluene. In another vial, 16.85 mg (0.19 mmol) of $^{Ph2PPr}$ADIH was mixed with 5 mL of toluene. The Ni(COD)$_2$ solution was added dropwise to the ligand solution and an instantaneous color change from pale yellow to dark orange was observed. The mixture was allowed to stir for 24 hours at 23° C. The solution was filtered through a frit and the solvent was removed from the filtrate under vacuum. The solid residue left behind was washed with ether and pentane to remove COD and then dried to obtain ($^{Ph2PPr}$ADIH)Ni.

$^1$H NMR, (400 MHz, benzene-d$_6$): δ 9.94 (s, 5H, phenyl), 7.90 (s, 1H), 7.72 (s, 1H), 7.67-7.59 (m, 1H), 7.51 (m, 1H), 7.41 (d, J=7.8 Hz, 1H), 7.26 (ddd, J=24.5, 16.1, 9.1 Hz, 2H), 7.12 (d, J=7.5 Hz, 2H), 7.05 (dt, J=16.0, 7.3 Hz, 7H), 6.84 (s, 1H), 6.71-6.61 (m, 1H), 5.58 (s, 3H), 3.24 (s, 1H), 3.05 (s, 1H), 2.95 (s, 1H), 2.56 (s, 1H), 2.22 (s, 6H), 2.00-1.85 (m, 3H), 1.74 (s, 2H), 1.41 (s, 2H).

$^{31}$P NMR (162 MHz, benzene-d$_6$): δ 19.89 (s, PPh$_2$).

Example E

Preparation of [(2,6-bis(1-((3-(diphenylphosphaneyl)propyl)-imino)ethyl)phenyl)MnH][Br] (hereafter [($^{Ph2PPr}$ADI)MnH][Br], shown below).

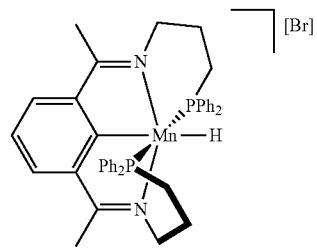

Under inert atmosphere, a 100 mL Schlenk bomb was charged with 0.429 g (0.7 mmol) of $^{Ph2PPr}$ADIH, in 10 mL of THF, followed by 0.192 g (0.7 mmol) of (CO)$_5$MnBr in 15 mL of THF. The evolution of CO was observed. The bomb was sealed, the solution was frozen with liquid nitrogen, and the reaction was degassed on a Schlenk line. Upon warming to room temperature, the reaction was set to reflux at 90° C. in an oil bath. After every 12 hours, the solution was cooled to room temperature, frozen with liquid nitrogen, and degassed under vacuum to remove liberated CO. Heating was stopped after 4 days. After once again removing CO, the bomb was brought inside the glovebox and the resulting reddish-brown solution was filtered through Celite. The solvent was evacuated in vacuo to afford a red glass. The product was washed with 10 mL of toluene followed by 5 mL of pentane and dried under vacuum to obtain a reddish-orange solid. Recrystallization from THF at 35° C. afforded 0.125 g (0.167 mmol, 24% yield) of orange crystals identified as [($^{Ph2PPr}$ADI)MnH][Br], $^1$H NMR (400 MHz, benzene-d$_6$, 25° C.): −7.73 (t, 1H, J=44.8 Hz). $^{31}$P NMR (162 MHz, benzene-d$_6$, 25° C.): 95.62.

Examples F-G Carbonyl Hydrosilylation Reactions

Example F

Hydrosilylation of benzaldehyde with phenylsilane using 0.1 mol % of $(^{Ph2PPr}ADI)Co$.

In the glove box, a mixture of 0.470 mL (4.62 mmol) of benzaldehyde and 0.570 mL (4.62 mmol) of $PhSiH_3$ was added to a 20 mL scintillation vial containing 3.1 mg (0.00462 mmol) of $(^{Ph2PPr}ADI)Co$. The resulting orangish-brown solution vigorously bubbled and was allowed to stir at room temperature for 2 min and then exposed to air to deactivate the catalyst.

$^1H$ NMR spectroscopy revealed greater than 99% conversion. The solution was hydrolyzed with 2 mL of 10% NaOH and allowed to stir for 2 h. The organic product was extracted using $Et_2O$, filtered through Celite and dried over $Na_2SO_4$ to obtain benzyl alcohol in 87% isolated yield.

$^1H$ NMR (400 MHz, benzene-$d_6$): δ (ppm) 7.21 (d, 2H, phenyl), 7.14 (d, 2H, phenyl), 7.07 (d, 1H, phenyl), 4.38 (s, 2H, —$CH_2$), 3.76 (s, 1H, —OH). The maximum TOF for this reaction using 0.01 mol % of $(^{Ph2PPr}ADI)Co$ was 9,900 $min^{-1}$.

Example G

Hydrosilylation of acetophenone with phenylsilane using 0.1 mol % of $(^{Ph2PPr}ADI)Co$.

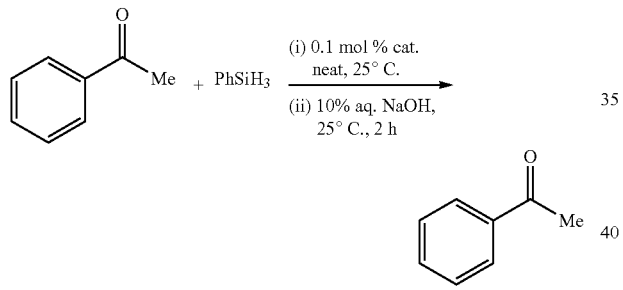

In the glove box, a mixture of 0.66 mL (5.66 mmol) of acetophenone and 0.70 mL (5.66 mmol) of $PhSiH_3$ was added to a 20 mL scintillation vial containing 3.8 mg (0.0056 mmol) of $(^{Ph2PPr}ADI)Co$. The resulting orangish-brown solution vigorously bubbled and was allowed to stir at room temperature for 2 min and then exposed to air to deactivate the catalyst.

$^1H$ NMR spectroscopy revealed greater than 99% conversion. The solution was hydrolyzed with 2 mL of 10% NaOH and allowed to stir for 2 h. The organic product was extracted using $Et_2O$, filtered through Celite and dried over $Na_2SO_4$ to obtain the corresponding alcohol in 91% isolated yield.

$^1H$ NMR (400 MHz, benzene-$d_6$): δ 7.18 (d, J=7.8 Hz, 2H), 7.09 (t, J=7.5 Hz, 2H), 7.01 (t, J=7.7 Hz, 1H), 4.56 (q, J=6.4 Hz, 1H), 3.55 (s, 1H), 1.25 (d, J=7.2 Hz, 3H).

Examples H-I Carboxylate Hydrosilylation Reactions

Example H

Hydrosilylation of ethyl formate with phenylsilane using 0.1 mol % of $(^{Ph2PPr}ADI)Co$.

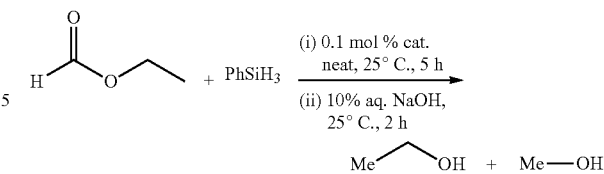

In the glove box, a mixture of 0.240 mL (2.98 mmol) of ethyl formate and 0.367 mL (2.98 mmol) of $PhSiH_3$ was added to a 20 mL scintillation vial containing 2.0 mg (0.00298 mmol) of $(^{Ph2PPr}ADI)Co$. The resulting orangish-brown solution was allowed to stir at room temperature for 5 hours and then exposed to air to deactivate the catalyst.

$^1H$ NMR spectroscopy showed greater than 99% conversion of the ethyl formate to the corresponding silyl ethers. A quartet at 3.56 ppm and a triplet at 1.07 ppm suggested the cleavage of the C—O ester bond. A small quantity of unreacted $PhSiH_3$ was observed at 4.22 ppm.

Example I

Hydrosilylation of ethyl acetate with phenylsilane using 0.1 mol % of $(^{Ph2PPr}ADI)Co$.

In the glove box, a mixture of 0.240 mL (2.98 mmol) of ethyl acetate and 0.367 mL (2.98 mmol) of $PhSiH_3$ was added to a 20 mL scintillation vial containing 2.0 mg (0.00298 mmol) of $(^{Ph2PPr}ADI)Co$. The resulting orangish-brown solution was allowed to stir at room temperature for 5 hours and then exposed to air to deactivate the catalyst.

$^1H$ NMR spectroscopy revealed 97% conversion of ethyl acetate to give a new quartet at 3.77 ppm and a triplet at 1.13 ppm. Small peaks for the unreacted ethyl acetate are observed at 3.92 and 1.66 ppm.

Nitrite Dihydrosilylation Reaction

Example J

Dihydrosilylation of benzonitrile with phenylsilane using 1 mol % of $(^{Ph2PPr}ADI)Co$.

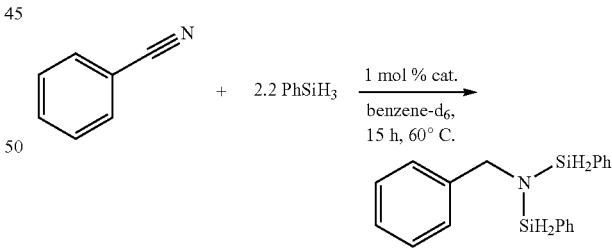

In the glovebox, a vial was charged with 0.19 mL (1.82 mmol) of benzonitrile and 0.49 mL (1.82 mmol) of $PhSiH_3$ was added to a 20 mL scintillation vial containing 12.2 mg (0.0182 mmol) of $(^{Ph2PPr}ADI)Co$. The resulting mixture was transferred to a J. Young tube and heated for 15 hours at 60° C. in an oil bath. $^{29}Si$ NMR spectroscopy revealed approximately 40% conversion to the corresponding N,N-disilylbenzylamine. $^{29}Si$ NMR spectroscopy also showed a peak at −22.53 ppm for $PhCH_2N(SiHPh_2)_2$, while unreacted $Ph_2SiH_2$ was observed at −60.65 ppm. A new singlet peak at 4.73 ppm in the $^1H$ NMR spectrum further confirmed the formation of $PhCH_2N(SiH_2Ph)_2$.

Examples K-M Dehydrogenative Coupling Reactions

Example K

Disilylation of aniline with diphenylsilane using 1 mol % of ($^{Ph2PPr}$ADI)Co.

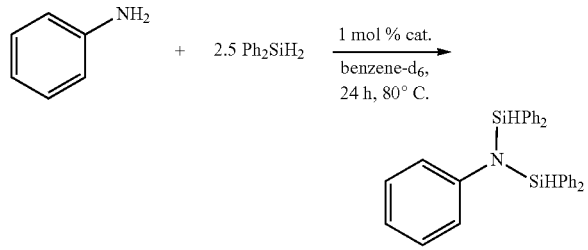

In the glove box, a mixture of 0.09 mL (0.984 mmol) of aniline and 0.46 mL (2.46 mmol) of Ph$_2$SiH$_2$ was added to a 20 mL scintillation vial containing 6.6 mg (0.00984 mmol) of ($^{Ph2PPr}$ADI)Co. The resulting orangish-brown solution was mixed thoroughly and transferred to a J. Young tube with 0.5 mL of C$_6$D$_6$. The J. Young tube was brought outside the glovebox and heated at 80° C. for 24 hours.

Greater than 99% conversion of the aniline to N,N-disilylaniline was observed by $^{29}$Si NMR spectroscopy due to complete disappearance of Ph$_2$SiH$_2$ at −60.65 ppm and emergence of a new peak at −15.01 ppm for —N(SiHPh$_2$).

Example L

Silylation of N-methylaniline with phenylsilane using 1 mol % of ($^{Ph2PPr}$ADI)Co.

In the glove box, a mixture of 0.06 mL (0.507 mmol) of N-methylaniline and 0.12 mL (0.66 mmol) of PhSiH$_3$ was added to a 20 mL scintillation vial containing 3.4 mg (0.00507 mmol) of ($^{Ph2PPr}$ADI)Co. The resulting orangish-brown solution was mixed thoroughly and transferred to a J. Young tube with 0.5 mL of C$_6$D$_6$. The J. Young tube was brought outside the glovebox and heated at 80° C. for 24 hours.

Approximately 99% conversion of the N-methylaniline to N-methyl-N-silylaniline was observed. $^1$H NMR spectroscopy revealed a singlet at 2.78 ppm for the product —CH$_3$ resonance and another singlet at 5.93 ppm for —N(SiHPh$_2$).

$^{29}$Si NMR spectroscopy confirmed the formation of the product due to a single peak at −15.63 ppm.

Example M

Dehydrogenative coupling of phenylsilane and diethylamine using 5 mol % [($^{Ph2PPr}$ADI)MnH][Br].

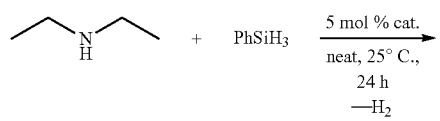

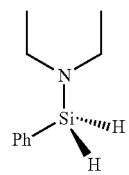

Under inert atmosphere, a 20 mL scintillation vial was charged with 0.005 g (0.007 mmol) of [($^{Ph2PPr}$ADI)MnH][Br], followed by 16 μL (0.131 mmol) of phenylsilane and 13.5 μL (0.131 mmol) of diethylamine. The loss of H$_2$ was observed. The reaction was allowed to occur at ambient temperature. More than 55% conversion was observed after 24 h by examining the formation of silylamine product and the consumption of starting amine $^1$H NMR resonances.

Example N

Dehydrogenative coupling of phenylsilane and dibutylamine using 5 mol % [($^{Ph2PPr}$ADI)MnH][Br]

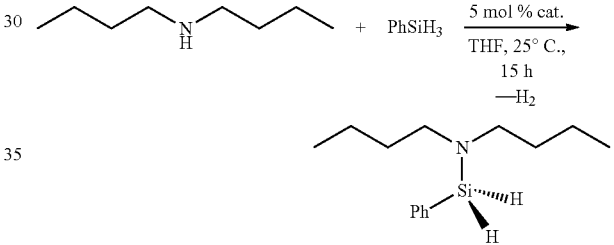

Under inert atmosphere, a 20 mL scintillation vial was charged with 0.004 g (0.005 mmol) of [($^{Ph2PPr}$ADI)MnH][Br] in 0.5 mL of THF, followed by 12 μL (0.096 mmol) of phenylsilane and 16 μL (0.096 mmol) of dibutylamine. The loss of H$_2$ was observed. The reaction was allowed to occur at ambient temperature. More than 45% conversion was observed after 15 h by examining the formation of silylamine product and the consumption of starting amine $^1$H NMR resonances.

Polycarbosilazane Synthesis

Example O

Dehydrogenative coupling of tris(2-aminoethyl)amine with polymethylhydrosiloxane using 0.5 mol % of ($^{Ph2PPr}$ADI)Co.

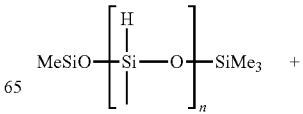

-continued

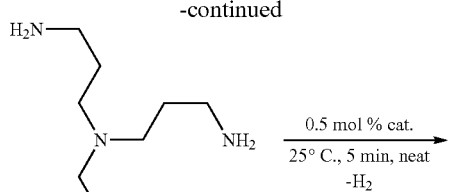

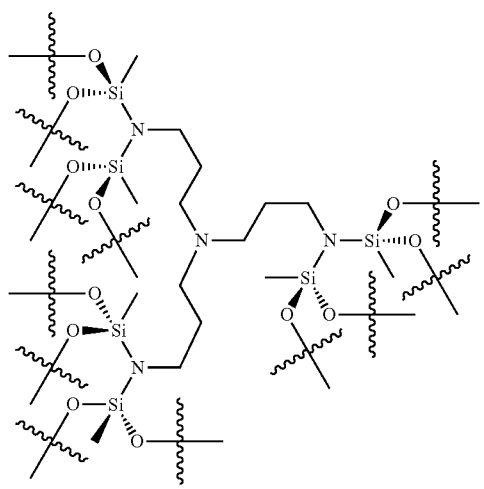

In the glovebox, a mixture of 0.057 mL (0.376 mmol) of tris(2-aminoethyl)amine and 0.14 mL (0.056 mmol) of polymethylhydrosiloxane was added to a 20 mL scintillation vial containing 1.2 mg (0.0018 mmol) of ($^{Ph2PPr}$ADI)Co. The resulting orangish-brown solution bubbled due to hydrogen gas evolution and the entire solution turned into solid. The mixture was allowed to stand for 5 min. The resulting solid was washed thoroughly with pentane and ether to obtain an off-white colored polymer. Thermogravimetric analysis was performed that shows the polymer is stable below 350° C. under nitrogen atmosphere.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of one or more aryl diimine complexes having a structure represented by one of general structures G-1.1 through G-1.15:

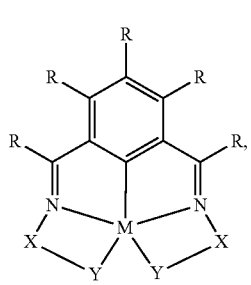

G-1.1

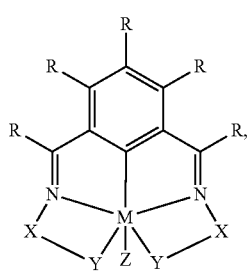

G-1.2

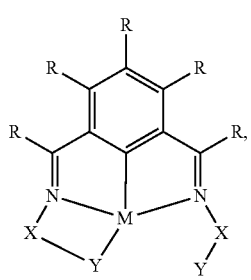

G-1.3

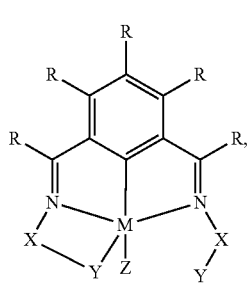

G-1.4

G-1.5
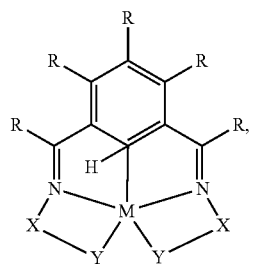

G-1.6
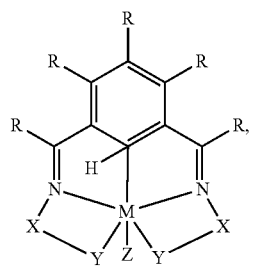

G-1.7
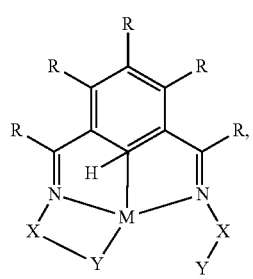

G-1.8
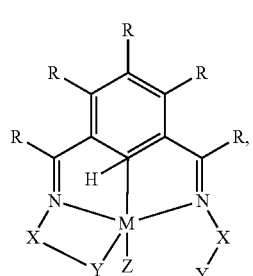

G-1.9
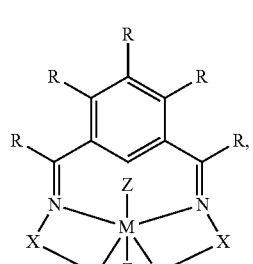

G-1.10
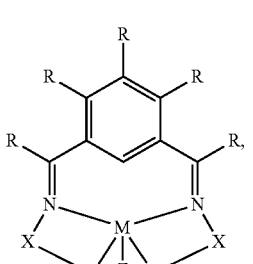

G-1.11
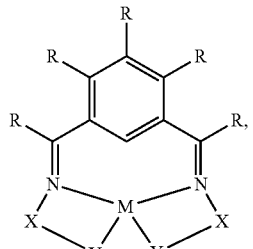

G-1.12
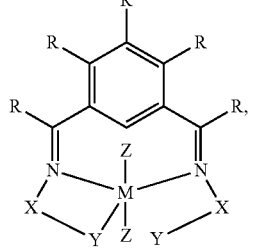

G-1.13
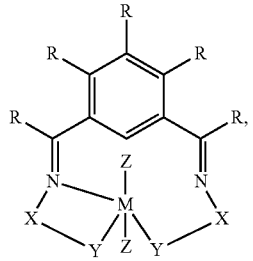

G-1.14
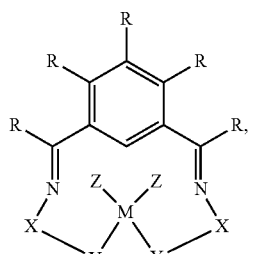

G-1.15
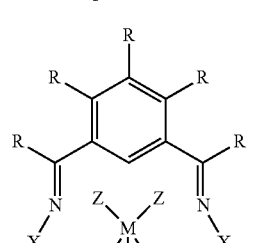

where:
each M represents Mn, Fe, Co, or Ni;
each Y independently represents PRn, NRn, AsRn, SbRn, BiRn, ORn, SRn, SeRn, TeRn, a heterocycle comprising P, N, As, Sb, Bi, O, S, Se, Te, and combinations thereof, wherein n=2, 1, or 0;
each X independently represents a substituted or unsubstituted $C_1$-$C_{24}$ alkylene or arylene linking group optionally comprising one or more heteroatoms;
each R, including R under the definition of Y, independently represents hydrogen; a substituted, unsubstituted, or cyclic $C_1$-$C_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; or any combination thereof; and each Z independently represents a hydride, alkyl, aryl, halide, alkoxide, aryloxide, carboxylate, or amido substituent.

2. The method claim 1, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or monofunctionalized reduced product (in the case of H—B, H—Al, H—C, H—Si, H—N, H—P, H—O, H—S, or H—Se).

3. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of a base and one or more of the aryl diimine complexes of claim 2.

4. The method of claim 3, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or monofunctionalized reduced product (in the case of H—B, H—Al, H—C, H—Si, H—N, H—P, H—O, H—S, or H—Se).

5. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of an organic solvent and one or more of the aryl diimine complexes of claim 1.

6. The method of claim 5, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or monofunctionalized reduced product (in the case of H—B, H—Al, H—C, H—Si, H—N, H—P, H—O, H—S, or H—Se).

7. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of an organic solvent, a base, and one or more of the aryl diimine complexes of claim 1.

8. The method of claim 7, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or monofunctionalized reduced product (in the case of H—B, H—Al, H—C, H—Si, H—N, H—P, H—O, H—S, or H—Se).

9. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of one or more salts comprising a cation or anion of one or more aryl diimine complexes having a structure represented by one of general structures G-1.1 through G-1.15:

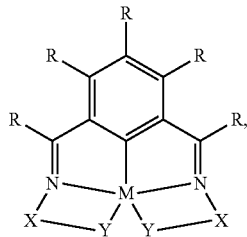

G-1.1

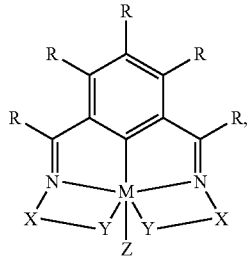

G-1.2

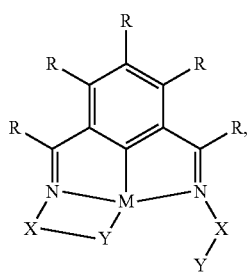

G-1.3

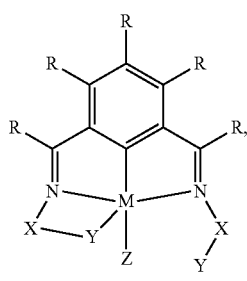

G-1.4

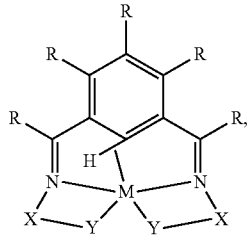

G-1.5

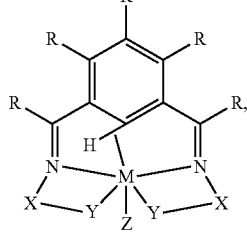

G-1.6

G-1.7 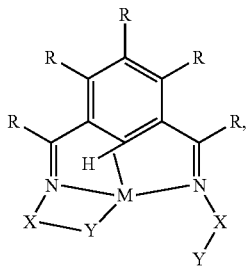

G-1.8 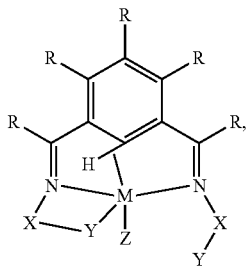

G-1.9 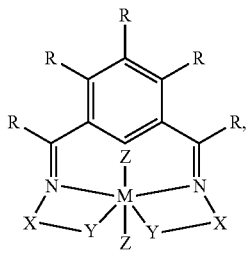

G-1.10 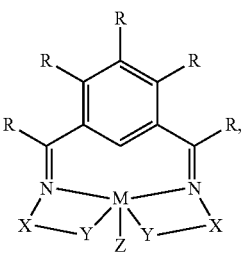

G-1.11 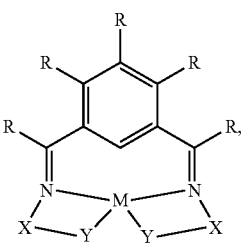

G-1.12 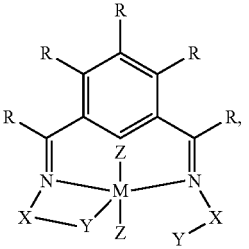

G-1.13 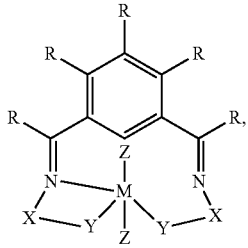

G-1.14 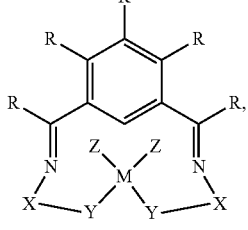

G-1.15 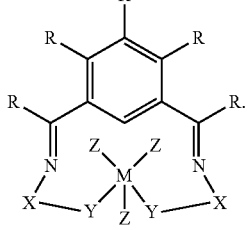

where:
each M represents Mn, Fe, Co, or Ni;
each Y independently represents $PR_n$, $NR_n$, $AsR_n$, $SbR_n$, $BiR_n$, $OR_n$, $SR_n$, $SeR_n$, $TeR_n$, a heterocycle comprising P, N, As, Sb, Bi, O, S, Se, Te, and combinations thereof, wherein n=2, 1, or 0;
each X independently represents a substituted or unsubstituted $C_1$-$C_{24}$ alkylene or arylene linking group optionally comprising one or more heteroatoms;
each R, including R under the definition of Y, independently represents hydrogen; a substituted, unsubstituted, or cyclic $C_1$-$C_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; or any combination thereof; and
each Z independently represents a hydride, alkyl, aryl, halide, alkoxide, aryloxide, carboxylate, or amido substituent.

10. The method of claim 9, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or monofunctionalized reduced product (in the case of H—B, H—Al, H—C, H—Si, H—N, H—P, H—O, H—S, or H—Se).

11. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of a base and one or more salts of claim 9.

12. The method of claim 11, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or monofunctionalized reduced product (in the case of H—B, H—Al, H—C, H—Si, H—N, H—P, H—O, H—S, or H—Se).

13. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of an organic solvent and one or more salts of claim 9.

14. The method of claim 13, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or mono functionalized reduced product (in the case of H—B, H—Al, H—C, H—Si, H—N, H—P, H—O, H—S, or H—Se).

15. A method of facilitating a hydrofunctionalization reaction, the method comprising reacting a reductant having a H—H, H—B, H—Al, H—C, H—Si, H—N, H—P, H—O, H—S, or H—Se bond with an unsaturated organic compound having a double bond or triple bond in the presence of an organic solvent, a base, and one or more salts of claim 9.

16. The method of claim 15, wherein the H—H, H—B, H—Al, H—C, H—Si, H—N, H—P, H—O, H—S, or H—Se bond of the reductant is added across the double bond or triple bond of the unsaturated organic compound to yield the saturated product (in the case of H—H) or monofunctionalized reduced product (in the case of H—B, H—Al, H—C, H—Si, H—N, H—P, H—O, H—S, or H—Se).

* * * * *